United States Patent [19]
Reeves

[11] 3,944,084
[45] Mar. 16, 1976

[54] MEANS FOR PREVENTING DRY BURN IN A PAPER-PLASTIC DUNNAGE BAG

[76] Inventor: Robert L. Reeves, Pinecrest Circle Drive, Sheridan, Ark. 72150

[22] Filed: Dec. 26, 1974

[21] Appl. No.: 536,636

Related U.S. Application Data

[63] Continuation-in-part of Ser. No. 520,014, Nov. 1, 1974.

[52] U.S. Cl............................ 214/10.5 D; 105/468
[51] Int. Cl.² ............................................ B60P 7/14
[58] Field of Search............... 214/10.5 D; 105/468; 9/316; 5/348 R

[56] References Cited
UNITED STATES PATENTS

| | | | |
|---|---|---|---|
| 2,993,217 | 7/1961 | Switlik ...................... | 214/10.5 D X |
| 3,414,140 | 12/1968 | Feldkamp ...................... | 214/10.5 D |
| 3,868,026 | 2/1975 | Baxter............................ | 214/10.5 D |

*Primary Examiner*—Frank E. Werner
*Attorney, Agent, or Firm*—Hill, Gross, Simpson, Van Santen, Steadman, Chiara & Simpson

[57] ABSTRACT

A dunnage bag having multiple outer plies of paper and an inner ply of plastic has an air diffuser extending across the inflation valve outlet and connected to the bag to prevent dry burn from inflation of the bag by high-pressure air. The diffuser constitutes a porous flat member having an expanded thickness and through which an air stream is expanded by deforming the member spherically outwardly, thereby to diffuse the flow of air and prevent any vibratory forces tending to produce a dry burn effect on the plastic ply opposite the valve outlet.

6 Claims, 3 Drawing Figures

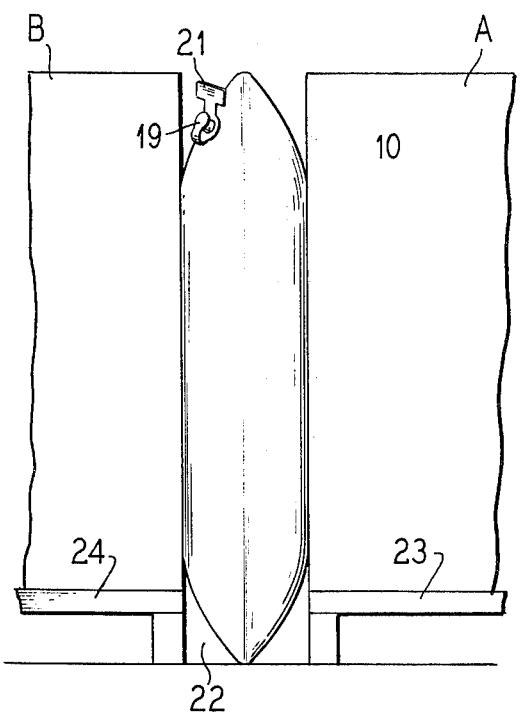
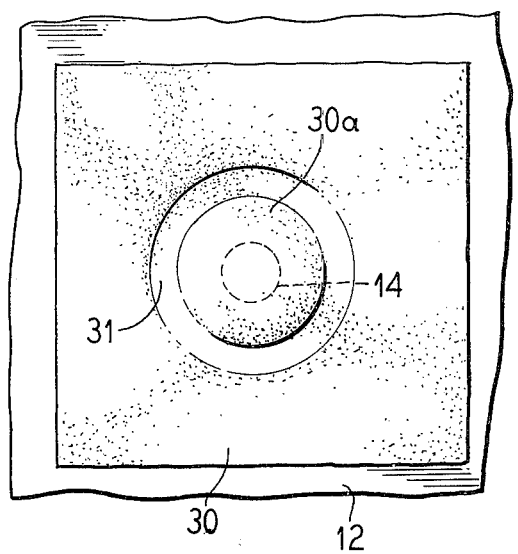
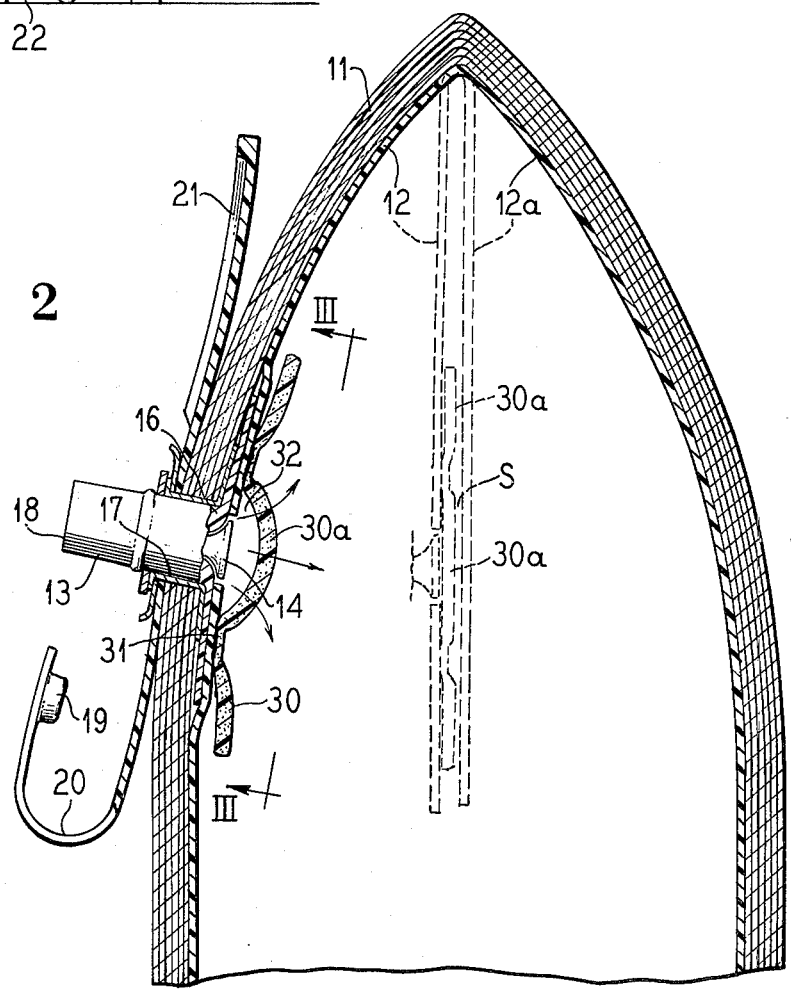

MEANS FOR PREVENTING DRY BURN IN A PAPER-PLASTIC DUNNAGE BAG

RELATED APPLICATION

This application is a continuation-in-part of my application of the same title, U.S. Ser. No. 520,014, filed Nov. 1, 1974.

BACKGROUND OF THE INVENTION

1. Field of the Invention

This invention relates generally to paper plastic dunnage bags.

2. The Prior Art

In paper plastic dunnage bags heretofore provided, an attempt has been made to prevent dry burn by merely taping an additional piece of plastic in the form of a loose flap on the opposite inside surface of the bladder. That additional flap is intended to prevent the burn of the surfaces caused by high frequency vibration sometimes developed in the plastic on the initial input of air under pressure into the interior of the bag. Since the polyethylene used in the bladder is a high density polyethylene which is linear in molecular structure, the plastic bladder frequently develops holes or is weakened and will rupture and tear, rendering the dunnage bag incapable of maintaining pressure.

SUMMARY OF THE INVENTION

In my co-pending parent application instead of using an ordinary piece of plastic, a square of expanded plastic or a square of corrugated paper is used to baffle the stream of air. The present invention shows yet another application of that basic concept wherein a porous sheet of discrete thickness is bonded by heat sealing to the plastic bladder circumjacent the valve outlet into the bladder and covers the valve outlet. The polyvinyl will separate the plys of the bladder to prevent dry burn by dissipating and diffusing the stream of air upon first injection of air and will expand or enlarge and slow or dissipate the stream of air for further inflation by forming a porous bubble surface inwardly adjacent the valve outlet and diffusing the air to the interior of the bladder across its entire surface in a spherically outward direction, thus dissipating any tendency towards promoting the promulgation of vibratory forces tending to produce a dry burn effect on the plastic ply.

DESCRIPTION OF THE DRAWINGS

FIG. 1 is a fragmentary elevational view of a paper plastic dunnage bag in a typical use environment.

FIG. 2 is an enlarged fragmentary cross-sectional view of the bag of FIG. 1 and showing in dotted lines the bag in deflated condition and showing in full lines the bag in inflated position to illustrate additional details of the parts.

FIG. 3 is an elevational view of the diffuser means taken on line III—III of FIG. 2.

DESCRIPTION OF THE PREFERRED EMBODIMENTS

Referring to FIG. 1, an inflatable disposable paper plastic dunnage bag is shown generally at 10. Such a bag is made from multi-layers of high grade paper, as shown at 11 on FIG. 2, with inner walls 12 and 12a of leak-proof polyethylene film. A valve 13 is mounted in the wall 12 and comprises a valve of the automobile tire type wherein an actuate air inflow is permitted with no outflow. Thus, a spring-pressed valve head is shown at 14 which seats against a valve seat 16 and which is carried in a valve body 17. An air inlet 18 can be selectively closed by a snap-in cover 19 carried on the end of an arm 20. A T-shaped handle 21 extends from the other side of the valve member to facilitate manipulation of the valve and the bag during inflation thereof.

In usage, deflated, or partially inflated, bags are simply placed in an open space 22 between a load illustrated in FIG. 1 as constituting any typical load having part A and part B on opposite sides of the space 22 and which parts A and B are loaded on pallets 23 and 24, respectively. Compressed air is then applied to the valve inlet 18 until the required pressure is reached. When the shipment reaches its destination, the bags are simply punctured and discarded.

The inner wall of leak-proof polyethylene film forming the inside bladder of the inflatable dunnage bag is customarily provided as a high density polyethylene which is linear in molecular structure. Thus, when air is initially introduced into the inlet 18 of the valve, there is sometimes a tendency of such airstream to set up vibratory forces and high frequency vibrations which tend to produce holes or ruptures in the polyethylene film. If that occurs, the bag will be prematurely broken and will lose its functional utility. Under the circumstances, some effort has been made to correct such problem which is frequently referred to as "dry burn" by taping a loose flap of polyethylene film on the opposite inside surface of the bladder. However, such loose flap is not completely reliable and may actually be destroyed itself by the vibratory air forces since the flap is so thin as to be practically negligible insofar as its influence on the inrush of air is concerned, when the bag is in a deflated condition.

In accordance with the principles of my co-pending application, Ser. No. 520,014, filed Nov. 1, 1974, it is contemplated that an air diffuser means be provided to baffle the valve outlet to the interior of the bag with a sheet of discrete thickness to expand the stream of air as it emerges from the valve, decreasing its speed and diffusing the air into the interior of the bag without dry burn of the bladder wall opposite the valve outlet. The present disclosure shows yet another species of that concept wherein a porous polyvinyl sheet is heat fused to the plastic ply and covers the air inlet.

Referring specifically to FIG. 2, an air diffuser means 30 is attached to the inner wall 12 of the loak-proof polyethylene film comprising the bladder of the bag, the attachment being a heat fused or thermal bond formed at an annular surface 31 and spaced radially outwardly from the valve outlet 14. The diffuser material 30 is preferably a porous sheet which may be approximately 3 inches (7.5 cm) square and have a free portion 30a within the attachment annulus 31, the free portion 30a having a diameter of approximately one inch (2.5cm) and the annulus 31 having an outside diameter of an inch and a half (3.8 cm). The sheet 30 in its unstressed form may be approximately one-eighth inch (0.32 cm) in thickness and may be made of a suitable thermally responsive material such as expanded polyvinyl. The expanded polyvinyl diffuser means is characterized by randomly disposed air passages which will diffuse air through the thickness of the sheet 30 with a pressure drop due to the resistance of the walls of the passages.

In operation, when the dunnage bag 18 is new and the interior of the bag is essential devoid of air, the walls 12 and 12a adjoin one another throughout the bag 10 but are spaced apart near the valve outlet 14 as shown at S in FIG. 2 by the thickness of the polyvinyl diffuser sheet 30. The sheet 30 protects the ply 12a from dry burn upon initial inflation of the bag in the same manner as the sheets 126 or 26 of the parent application. When the bag is partially inflated, the portion 30a of the sheet 30 which is within the attachment annulus 31 will be deformed or will expand substantially hemispherically outwardly from valve outlet 14 to define a zone 32 of air substantially at input pressure. Air will escape both transversely and axially from zone 32 over the entire surface 30a within the annulus 31, creating a pressure drop across the diffuser portion 30a as the stream of air flows from the valve outlet 14 to the interior of the bag. Thus, dry burn of the surface 12a is prevented both at initial and partial inflations since all of the air introduced into the bag must necessarily pass through the porous baffle.

Although various minor modifications might be suggested by those versed in the art, it should be understood that I wish to embody within the scope within the patent warranted hereon all such modifications as reasonably and properly come within the scope of my contribution to the art.

I claim as my invention:

1. A dunnage bag comprising:
   multiple outer plies of paper and an inner ply of plastic formed as a closed inflatable tube;
   a one-way inflation valve having an inlet end disposed in an accessible location outside said bag on a wall thereof and having an outlet end projecting inwardly of said plastic through said wall to admit air under pressure inside said tube; and
   means to prevent dry burn when charging said bag with air comprising:
      an air stream diffuser positioned in register with the outlet end of said valve and being disposed between confronting surfaces of said plastic when the bag is in deflated condition,
      said diffuser comprising an expandable sheet-form member of elastic porous material having sufficient thickness and included area to diffuse therethrough at reduced velocity the air projected through said valve by forming a porous bubble surface extending into the interior of the bag.

2. A dunnage bag as defined in claim 1 wherein said means to prevent dry burn comprises a sheet of expanded polyvinyl being attached to the plastic ply circumjacent the outlet end of said valve within the inflatable tube.

3. In an inflatable paper plastic dunnage bag of the type having an air valve extending between the inside and the outside thereof, the improvement of means to prevent dry burn of the plastic bladder opposite and adjacent to the valve, said means comprising:
   porous sheet form means of discrete thickness forming restricted air passage means and having a bonded annular joint connecting the sheet form means to the plastic bladder outwardly of the air valve so that said sheet form means extends over the air valve outlet,
   said sheet form means forming a porous bubble surface in response to the air flow therethrough for expanding the stream of air from the valve and dissipating its dynamic energy to charge the interior of the bag with a static supply of air at increased pressure.

4. In an inflatable paper plastic dunnage bag as defined in claim 3, said sheet form means comprising a piece of expanded polyvinyl plastic.

5. In an inflatable paper plastic dunnage bag as defined in claim 4, said sheet form means being thermally fused to the inner side of the plastic bladder circumjacent to and overlying said valve.

6. In an inflatable paper plastic dunnage bag as defined in claim 3, said porous sheet form means being made of elastic material and deforming in response to incoming air to form a substantially hemispherical zone of air at increased pressure and through the walls of which all of the air entering the bag is diffused for the purposes set forth.

* * * * *